United States Patent [19]

Farr

[11] 4,173,866
[45] Nov. 13, 1979

[54] HYDRAULIC SYSTEMS

[75] Inventor: Glyn P. R. Farr, Leek Wooton, England

[73] Assignee: Girling Limited, Birmingham, England

[21] Appl. No.: 871,448

[22] Filed: Jan. 23, 1978

[30] Foreign Application Priority Data

Jan. 26, 1977 [GB] United Kingdom ............. 3119/77
Jan. 26, 1977 [GB] United Kingdom ............. 3120/77

[51] Int. Cl.² ............................................. F15B 1/02
[52] U.S. Cl. ........................................ 60/413; 60/418;
 60/494; 137/115
[58] Field of Search ............. 60/413, 418, 459, 484,
 60/494; 137/115

[56] References Cited

U.S. PATENT DOCUMENTS

| | | | |
|---|---|---|---|
| 2,799,995 | 7/1957 | Herman | 60/418 |
| 3,812,675 | 5/1974 | Cochrane | 60/413 |
| 3,991,570 | 11/1976 | Keller | 60/413 |

*Primary Examiner*—Edgar W. Geoghegan
*Attorney, Agent, or Firm*—Scrivener, Parker, Scrivener & Clarke

[57] ABSTRACT

In an hydraulic system in which an hydraulic accumulator is charged with hydraulic fluid under pressure by means of an hydraulic pump which draws hydraulic fluid from a tank, and an unloader valve disposed in a supply line between the pump and the accumulator is operative to prevent the accumulator from being overcharged and to allow the pump to re-charge the accumulator should the pressure stored therein fall below a desired minimum value, the unloader valve incorporates a control valve, and a pressure responsive slave which is operated by fluid pressure under the control of the control valve. The control valve comprises a valve member which is movable between a first position in which the accumulator is isolated from the slave so that pump pressure is supplied to the accumulator, and a second position in which fluid pressure from the accumulator can act on the slave to render the slave operative to reduce the pump pressure or disable the pump, and a cut-out spring for biassing the valve member at all times towards the first position. The valve member has different effective areas of which a smaller area is subjected to a control pressure dependent upon the pressure in the accumulator and in response to which the valve member can move at a cut-out point from the first position into the second position, and a greater area is subjected to the pressure in the accumulator, at least when the control member is in the second position, to determine a cut-in point at an accumulator pressure less than the pressure in the accumulator at the cut-out point and at which the control member can move from the second position into the first position.

11 Claims, 11 Drawing Figures

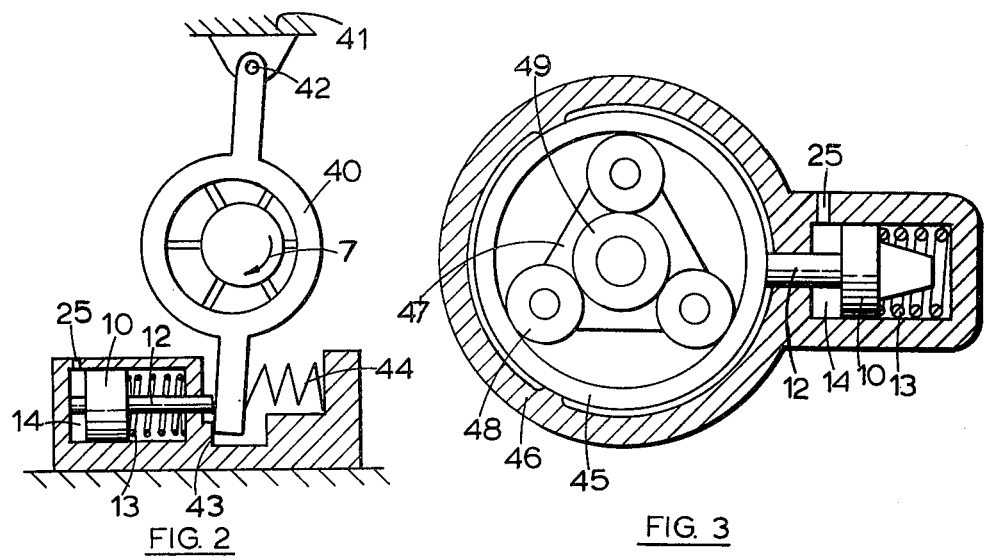
FIG. 2
FIG. 3
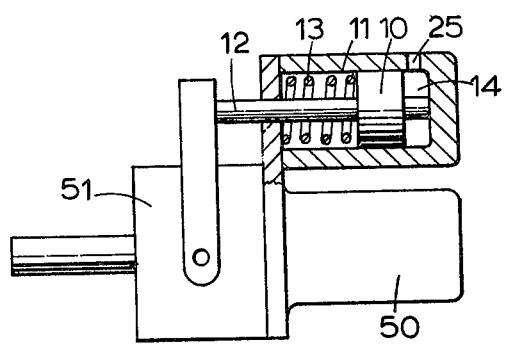
FIG. 4
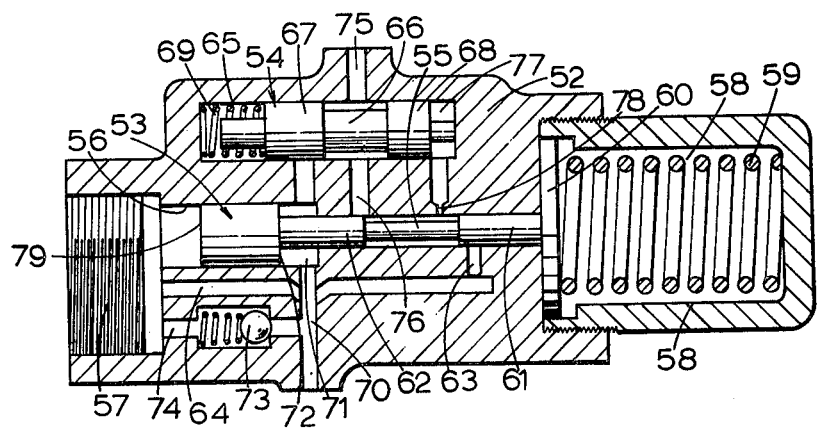
FIG. 5

HYDRAULIC SYSTEMS

This invention relates to improvements in hydraulic systems of the kind in which an hydraulic accumulator is charged with hydraulic fluid under pressure by means of an hydraulic pump which draws hydraulic fluid from a tank, and an unloader valve disposed in a supply line between the pump and the accumulator is operative to prevent the accumulator from being overcharged and to allow the pump to re-charge the accumulator should the pressure stored therein fall below a desired minimum value. Our invention is particularly concerned with improvements in unloader valves for hydraulic systems of the kind set forth.

In an hydraulic system of the kind set forth the unloader valve provides the accumulator with a working range in which the pump can idle, or be disabled, to prevent the hydraulic fluid from overheating. Ideally, when the accumulator pressure is at a maximum, the pump should be inoperative so that there will be no circulation of fluid. As this would mean zero pump torque when idling, such an ideal is not always practical and it may be preferable for the pump to be allowed to circulate fluid at zero pressure.

Known unloader valves incorporate in parallel a cut-out valve suitably a first control piston which is loaded by a first spring, and a diverter valve, suitably a second control piston which is loaded by a second spring, with both valves subjected to pressure in the accumulator, in which the cut-out valve determines a "cut-out point at which it closes to prevent the accumulator from being overcharged when a force generated by accumulator pressure exceeds the force in the first spring and, after the cut-out closes, the diverter valve moves in opposition to the second spring into a diverting position in which pump pressure is diverted, suitably to the tank, until the pressure in the accumulator has dropped to a value at a "cut-out" point at which the second spring moves the diverter valve into a position to re-apply pump pressure to the accumulator until the cut-off point is again reached. Once unloaded the fluid from the pump must still circulate back to the tank and this places an unnecessary amount of work on the fluid, especially if the pump is driven by the prime mover of a vehicle, and the vehicle is suitable for high speed cruising, for example on motorways.

According to our invention in an hydraulic system of the kind set forth the unloader valve incorporates a control valve, and a pressure responsive slave which is operated by fluid pressure under the control of the control valve, the control valve comprising a valve member which is movable between a first position in which the accumulator is isolated from the slave so that pump pressure is supplied to the accumulator, and a second position in which fluid pressure from the accumulator can act on the slave to render the slave operative to reduce the pump pressure or disable the pump, and a cut-out spring for biassing the valve member at all times towards the first position, the valve member having different effective areas of which a smaller area is subjected to a control pressure dependent upon the pressure in the accumulator and in response to which the valve member can move at a cut-out point from the first position into the second position, and a greater area is subjected to the pressure in the accumulator, at least when the control member is in the second position, to determine a cut-in point at an accumulator pressure less than the pressure in the accumulator at the cut-out point and at which the control member can move from the second position into the first position.

The cut-out spring acting on the valve member provides a positive movement between the first and second positions. The construction is therefore, relatively simple and compact, requiring only the provision of the slave to control the pressure of the pump in accordance with the pressure existing in the accumulator at the cut-in and cut-out points.

At the cut-out point the pressure from the accumulator is fed to the slave before the pump is disabled and at the cut-in point the accumulator pressure is discharged from the slave before the pump is re-engaged. This makes it suitable for pumps with ripple free outputs. Preferably a restrictor is placed between the slave and the control valve to allow a smooth and gentle re-engagement of the pump at the cut-in point.

Conveniently the valve member comprises a valve spool which works in a bore in the housing and is acted on at one end by the spring, and the valve spool includes axially spaced lands which control communication between passages in the housing which are connected to the pump, the slave and the accumulator and a one-way valve is located in the housing between those passages which are connected respectively to the pump and the accumulator to permit flow from the pump into the accumulator.

The control pressure acting on the smaller area may comprise the accumulator pressure itself, the pump pressure itself, or a combination of both.

The slave may comprise a piston which acts to disable the pump, for example by disconnecting a drive to the pump, when the cut-out pressure is attained. Thus, no fluid is circulated by the pump during the period that the pressure in the accumulator drops from the cut-off point to the cut-in point.

Alternatively, the slave may comprise a slave member for connecting the pump to the tank when the cut-out pressure is attained. This provides circulation of fluid through the unloader valve at a low pressure during the period that the pressure in the accumulator drops from the cut-out point to the cut-in point.

In another embodiment the unloader valve comprises a priority valve for regulating and determining the relative proportions of fluid supplied to a brake-operating hydraulic servo of an hydraulic braking system and a power steering mechanism, the accumulator being adapted to operate the servo and the slave comprises a slave member for controlling communication between the pump and the power steering mechanism. In this embodiment, the slave preferably comprises a differential piston working in a stepped bore with first and second chambers of greater and smaller areas defined in the bore at opposite ends of the piston, the first chamber being in communication with the tank and cut-off from the accumulator when the valve member is in the first position and being in communication with the accumulator when the valve member is in the second position, and a by-pass valve is housed in the second chamber for controlling communication between the pump and the accumulator through a one-way valve and between the pump and the steering mechanism, the by-pass valve comprising a spool working in the chamber of smaller area and having an inner end of reduced diameter, a land for closing an exhaust port in communication with a first outlet connected to the steering mechanism, and a restricted passage providing communication between the pump and the accumulator through the spool at all times, and a by-pass spring urging the inner end of the spool towards the differential piston and into a cut-out position in which the exhaust port is closed, the spool being urged towards a delivery position by the pump pressure to expose at least partially the exhaust port when the pump is operating and the differential piston acting to urge the spool into the delivery position to expose the exhaust port fully when the valve member is in the second position.

Thus a substantial proportion of the pump pressure is available for the steering mechanism through the by-pass valve when the pump is operating, and a relatively small proportion of the pump pressure is utilised through the restricted passage and the one-way valve to charge the accumulator and to ensure that the pressure in the accumulator is maintained above a minimum value.

The by-pass spring acts to maintain a predetermined differential between the higher pump pressure supplied to the steering mechanism and the lower pressure supplied to the accumulator.

The valve member is provided with an area subjected to pressure in the accumulator with the cut-out spring acting in a direction in opposition to the force applied to the valve member due to pressure acting over that area. The area and the strength of the cut-out spring is chosen to ensure that the valve member is held in the supply position until the accumulator is charged to a predetermined value at which point the valve member moves into the divert position to prevent further increase in the pressure applied to the accumulator since the exhaust port is thereafter fully exposed, the valve member remaining in the divert position until the pressure in the accumulator has dropped to a value at which the cut-out spring can overcome the force acting in the opposite direction.

Some embodiments of our invention are illustrated in the accompanying drawings in which:

FIG. 2 shows a different pump and modified pump drive for use in the system of FIG. 1;

FIG. 3 shows another pump and pump drive;

FIG. 4 shows yet another pump and pump drive;

FIG. 5 is a longitudinal section through an unloader valve for an hydraulic system similar to the system of FIG. 1;

Figure 1:
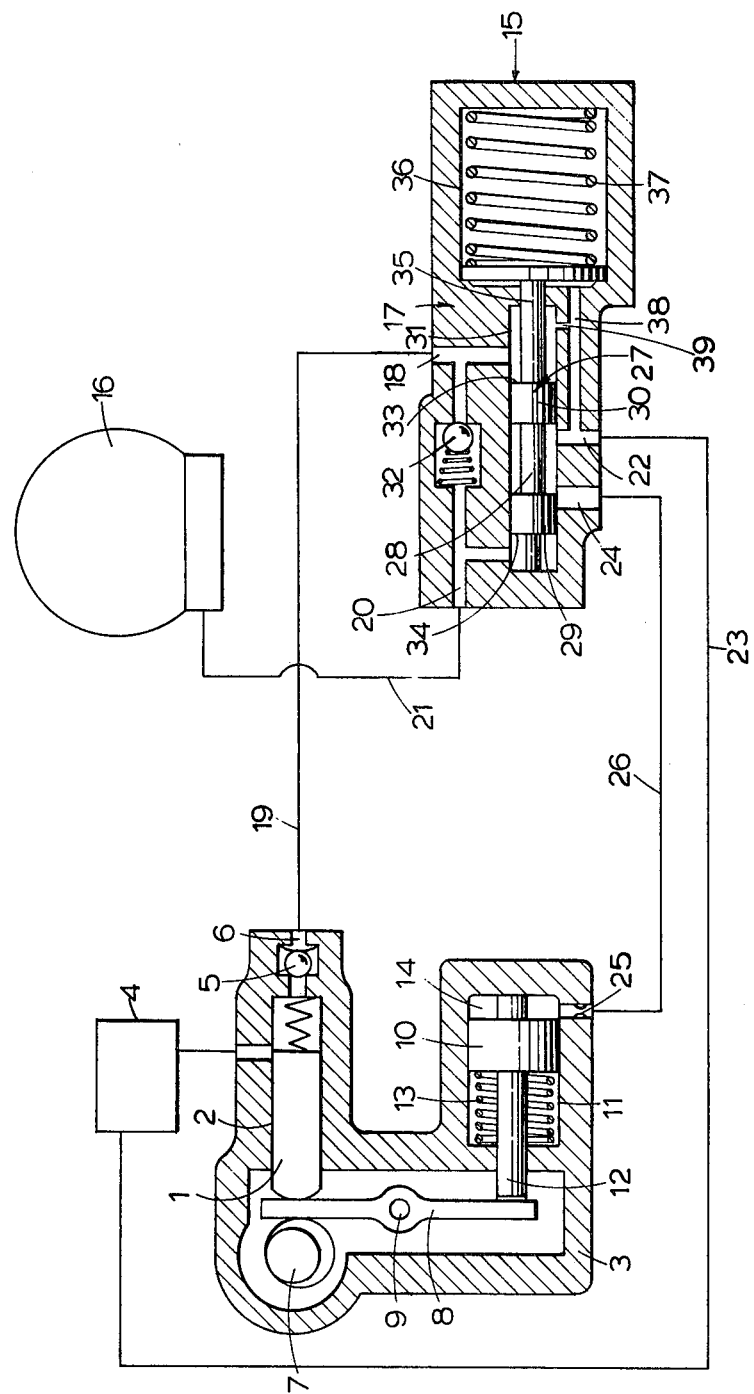
FIG. 1 is a layout of one hydraulic system.

The hydraulic system illustrated in FIG. 1 of the accompanying drawings incorporates a pump comprising a pump plunger 1 which is reciprocally driven in a bore 2 in a housing 3 to draw hydraulic fluid from a tank 4 and discharge it through a one-way valve 5 and an output port 6. The plunger 1 is reciprocated by an eccentric drive 7 acting on the plunger 1 through a lever 8 which is pivotally connected at an intermediate point in its length to a fixed pivot 9 in the housing 3. A slave piston 10 working in a cylinder bore 11 in the housing 3 is carried by a piston-rod 12 which is held out of engagement with the lever 8, by means of a spring 13, when a chamber 14 in the bore 11 on the opposite side of the piston 10 from the piston rod 12 is de-pressurised.

An unloader valve 15 is located between the pump and an hydraulic accumulator 16. The unloader valve 15 comprises a housing 17 having an inlet port 18 to which the output port 6 is connected through a supply line 19, an outlet port 20 connected to the hydraulic accumulator through a pipe-line 21, an exhaust port 22 connected to the tank 4 through a pipe-line 23, and a diverter port 24 connected to a restricted port 25 in the housing 3 which leads into the chamber 14 through a pipe-line 26.

A control valve 27 is located in the housing to control communication between the various ports. As illustrated the valve 27 comprises a single spool 28 provided with spaced lands 29 and 30 which work in a longitudinal bore 31 in the housing 17. The port 18 is connected to the port 20 through a one-way valve 32 and the ports 18 and 20 are themselves connected to opposite ends of the bore 31 so that, normally, pressures at these ports act on portions 33 and 34 of smaller and greater effective area respectively, which are disposed substantially at opposite ends of the spool 28. An extension 35 of reduced diameter extends from the land 30 into an enlarged chamber 36 which accommodates a cut-out spring 37 for urging the spool 28 in the direction shown, in which the ports 22 and 24 lie between the lands 29 and 30 to exhaust not only the chamber 14 to the tank 4 but also the chamber 36 to the tank through a passage 38 which connects the chamber 36 to the port 22. A restrictor 39 provides restricted communication between the bore 31 and the passage 38.

When the pump is operated initially, the unloader valve 27 is in the position shown. Fluid is drawn from the tank 4 and is pumped by the plunger 1 into the accumulator 16 through the one-way valve 5, and through the one-way valve 32. This continues until the pressure in the accumulator 16 which acts on the portion 34 of the spool which is of greater area, attains a predetermined value, say 2000 p.s.i. This pressure is sufficient to apply to the spool a net force greater than the force in the spring 37 plus the force acting in the opposite direction, namely the pump pressure acting over the portion 33 which is of smaller area. This has the result that the spool 28 moves in the bore 31 and relatively into the chamber 36 from the first position into the second position, compressing the spring 37 and placing the accumulator 16 in communication with the chamber 14 to pressurise that chamber, with no time delay as the pressure drop across the restricted port 25 is 2000 p.s.i. The piston 10 is then advanced in the bore 11 and the piston rod 12 moves the lever 8 angularly about the pivot 9 in a direction to urge the plunger 1 away from the drive 7, thereby disabling the pump and preventing further discharge through the output port 6. When the pump pressure falls by a bleed through the restrictor 39, the spool 28 increases its load on the spring 37 as the pressure in the annular chamber has fallen.

When the accumulator pressure drops to the cut-in pressure, say to 1500 p.s.i., the force produced by that pressure is less than the force acting in the opposite direction, so that the spool 28 is restored to its original first position. Since the chamber 14 is reconnected to the tank 4, after a time delay due to the pressure drop across the restrictor 25, which is determined by the spring 13 and the area of the piston 10, the piston 10 retracts under the influence of the spring 13 and the plunger 1 is again reciprocated by the drive 7.

The pressure applied to the smaller area portion 33 of the spool in opposition to the pressure of the accumulator may alternatively comprise the accumulator pressure or a combination of both the accumulator pressure and the pump pressure.

In the modified construction illustrated in FIG. 2 the drive 7 is surrounded by an eccentric housing 40 which is pivotally connected at its upper end to a fixed part 41 by means of a pivot 42, and the lower end of the housing 40 is urged into engagement, in a drive position, with a stop 43 adjacent to the piston rod 12, by means of a spring 44.

When the chamber 14 is pressurised, the piston 10 is advanced to urge the housing 40 angularly about the pivot 42 to make it concentric with the drive 7 and thereby disable the pump.

In the embodiment of FIG. 3 the pump has an epicyclic drive, and the piston rod 12 again projects from the housing. The epicyclic gear is normally operative, when the chamber 14 is unpressurised, since an outer ring gear 45 is prevented from rotating within a fixed housing 46 by the piston 12 which is urged into engagement with it by means of the spring 13. When an input drive 47 is operated, since the ring gear 45 is held against rotation, planet gears 48 rotate by travelling around the ring gear 45, and a sun gear 49 comprising the pump output is rotatably driven.

When the chamber 14 is pressurised, the piston 10 is withdrawn against the loading in the spring 13. The ring gear 45 can now rotate within the housing and does so in preference to the sun gear 49, since the torque within the pump is greater than the torque between the ring gear 45 and the planet gears 48. Thus under such conditions the drive to the pump is disabled.

In the embodiment of FIG. 4, the pump 50 is driven through a clutch 51, and the piston-rod 12 is operative to disengage the clutch 51 when the chamber 15 is pressurised.

The unloader valve illustrated in FIG. 5 of the accompanying drawings comprises a housing 52 incorporating a control valve 53 which is disposed in parallel with a slave valve 54.

The control valve 53 comprises a valve spool 55 of differential outline which works in a stepped bore 56 leading into an hydraulic accumulator 57 and at its end of smaller diameter leads into an enlarged chamber 58 in which is accommodated a compression spring 59. The compression spring 59 acts on the end of the spool 55, which is of smaller area, through an abutment plate 60 carried by the spool 55. Portions at opposite ends of the part of the spool 55 which is of smaller area comprise spaced lands 61 and 62 of which the land 62 normally closes a port 63 at one end of a passage 64 which leads to the accumulator 57.

The slave valve 54 comprises a longitudinal bore 65 which is closed at both ends and in which works a spool 66 comprising axially spaced lands 67 and 68. The spool 66 is normally biassed by a spring 69 acting on the free end of the land 67 into an inoperative position in which a supply passage 70 from the pump is closed by the land 67. The supply passage 70 passes through a chamber 71 between the part of the spool 55 which is of greater area and a shoulder at the step in diameter of the bore 56 so that a shoulder 72 between the different diameter parts of the spool 55 is exposed at all times to pump pressure.

Fluid from the pump is also supplied to the accumulator 57 through a one-way valve 73 which is disposed between the supply passage 70 and the branch passage 74.

An exhaust passage 75 leads to a tank at atmospheric pressure, from which the pump draws fluid, and the fluid passes through the bore 65 between the lands 67 and 68 and into a passage 76. The passage 76 communicates with a chamber 77 at the end of the bore 65 which is remote from the spring 69, through a portion of the bore 56 which is located between the lands 61 and 62, and a radial restricted passage 78.

In operation fluid from the pump, which is normally supplied to the accumulator 57 through the one-way valve 73, also acts on the shoulder 72 which is of an area smaller than the area 79 at the end of the spool 55 which is exposed to the pressure in the accumulator 57. When the pressure in the accumulator has attained a predetermined value, say 2000 p.s.i., at the cut-out point the net force applied to the spool namely the pressure of the accumulator (A) acting over the area 79 is greater than the pressure of the pump (P) acting over the area 72 plus the force in the spring 59 (S) with the result that the spool 55 moves into the chamber 58, from the first position into the second position, compressing the spring 59. In this condition therefore A-P is greater than S.

Movement of the spool 55 into the second position cuts-off communication from the passage 76 to the tank and opens the port 63 so that accumulator pressure is applied through the restricted passage 78 to the end of the spool 66 which is remote from the spring 69. The spool 65 moves towards the opposite end of the bore 65 against the force in the spring 69, thereby opening the connection between the pump and the tank through the supply passage 70 and the portion of the bore 65 which is then disposed between the lands 67 and 68. The pump is placed in communication with the tank so that the fluid is circulated in a closed circuit. The spool 55 is now loaded against the spring with a force A since P is now zero.

When the accumulator pressure has dropped to the cut-in pressure at say 1500 p.s.i. the force in the spring S is greater than A so that the spool 55 is restored to its original position to re-connect the tank to the passage 76 with the result after a time delay due to the restricted passage 78 the spool 66 is also restored by the spring 69 to its original position. Movement of the spool 66 to its original position cuts off the return to the tank so that the pump delivery pressure rises to re-charge the accumulator as described above.

In this construction the cut-out and the cut-in points can be selected and otherwise altered simply by providing a spring 59 of different pre-load.

The restricted passage 78 acts to ensure a uniform, gradual return of the spool 66 into its initial position when the pressure in the accumulator has fallen to the cut-in position.

Figure 6:
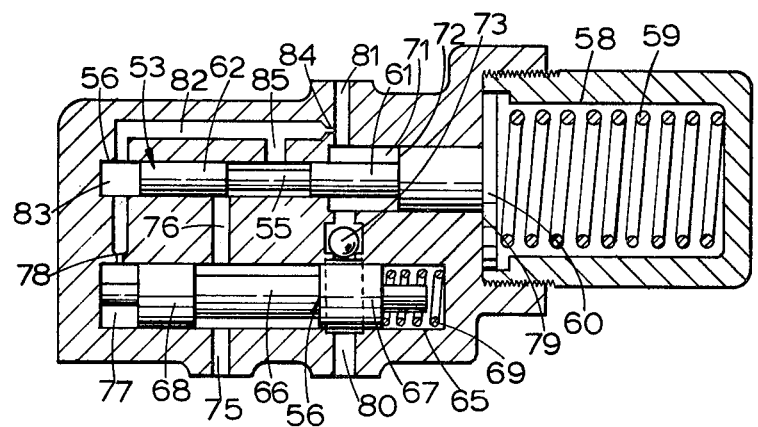
FIG. 6 is a longitudinal section of another unloader valve.

In the unloader valve illustrated in FIG. 6, the spring 59 acts on the free end of the part of the spool 55 which is of greater area, and an inlet port 80 connected to the pump by-passes the land 67 of the spool 66 and leads to the chamber 71 through the one-way valve 73. A passage 81 leads from the chamber 71 to the accumulator and the passage 81 is connected through a longitudinal passage 82 to a chamber 83 at the closed end of the bore 56 which is of smaller area. The passage 82 has a restrictor 84 and a radial passage 85 upstream of the restrictor 84 connects the passage 82 to a space in the bore 56 between the lands 61 and 62.

In operation the pump pressure is supplied to the accumulator through the passage 80, the one-way valve 3 and the passage 81 until a pressure at the cut-out point is reached at which the pressure at the accumulator A which acts over the area 72 exceeds the force in the spring 59. The spool 55 moves relatively into the chamber 58 to close the passage 76 and place or divert the accumulator pressure to act upon the end of the spool 53 to increase the load on the spring 59, and also to communicate with the chamber 77 through the passages 84, 82 and 78. Thereafter the spool 66 moves against the loading in the spring 69 to place the pump in communication with the tank through the bore 65 and passage 75.

In this embodiment the second restrictor 84 allows an increase in pressure in the chambers 77 and 83 to escape to the accumulator as the volumes of these chambers decrease when the cut-in pressure is attained.

The construction and operation of the embodiment of FIG. 6 is otherwise the same as that of FIG. 5 and corresponding reference numerals have been applied to corresponding parts.

Figure 7:
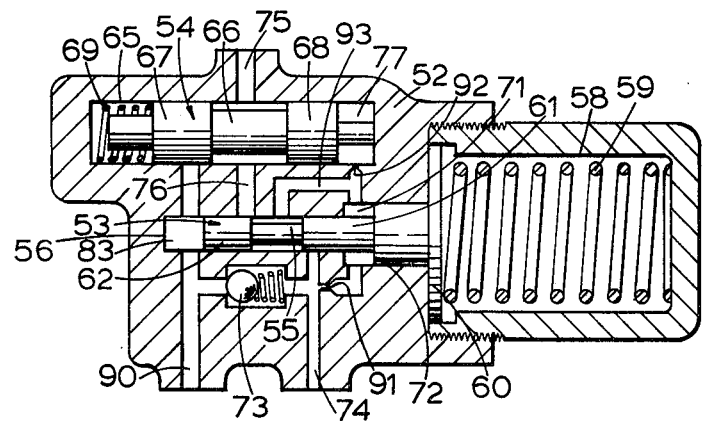
FIG. 7 is a longitudinal section of another unloader valve.

In the unloader valve of FIG. 7 the spring 59 again acts on the end of the part of the spool 55 which is of greater area.

A passage 90 for connection to the pump acts on the end of the spool 55 which is of smaller area through the chamber 83 and the opposite end of the passage 90 is normally closed by the land 67 of the spool 66. The chamber 71 is connected to the passage 74 through a restricted passage 91, and to the chamber 77 through a restricted passage 92 which, in turn, is connected through a passage 93 to the bore 56 between the lands 61 and 62.

In this construction the pump pressure acts on the free end of the spool 55 to provide the load P. As the pressure increases to the cut-out point the spool 55 moves into the chamber 58 when P is greater than S to close the passage 76 to the tank, and apply accumulator pressure to the chamber 71 so that the accumulator pressure acts on the area 72 to increase the force action against the spring 59. At the same time accumulator pressure is applied to the chamber 77 to move the spool 66 against the loading in the spring 69 with the result that the pump is placed in communication with the tank as described above. The force of the accumulator pressure acting over the area 72 is still greater than the load P.

The construction and operation of the valve is otherwise the same as in the embodiments of FIGS. 5 and 6, and corresponding reference numerals have been applied to corresponding parts.

Figure 8:
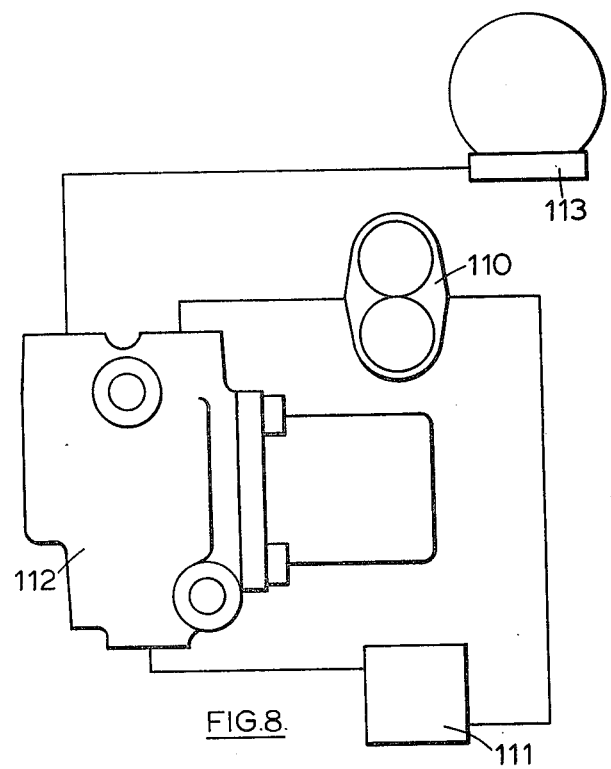
FIG. 8 is a layout of another hydraulic system.

FIG. 8 shows a layout of a typical hydraulic system suitable for incorporating any of the unloader valves described above with reference to FIGS. 5 to 7. In the system illustrated a pump 110 draws fluid from a tank 111 at atmospheric pressure and circulates through the unloader valve 112 to charge an accumulator 113.

Figure 9:
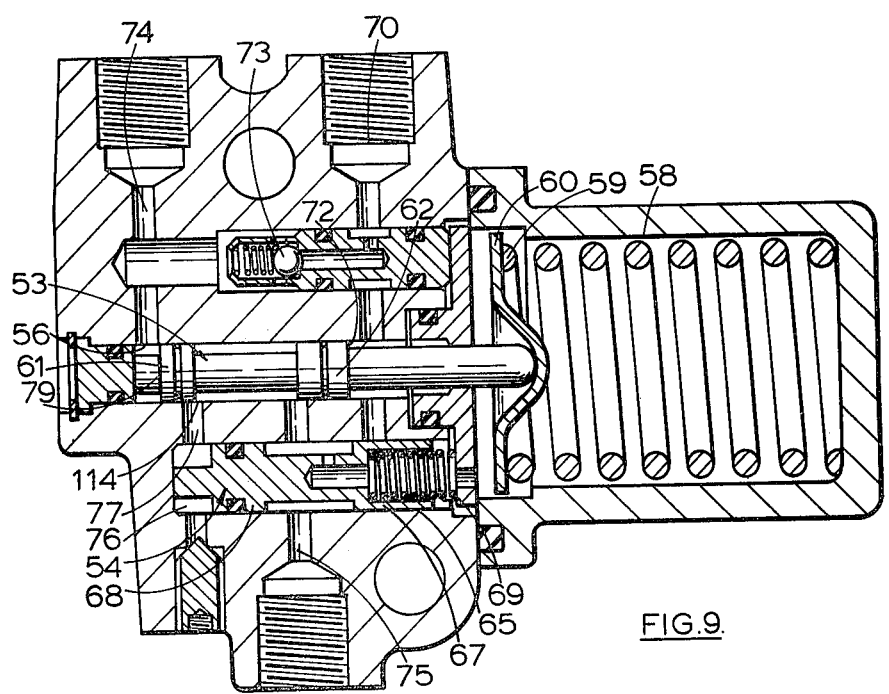
FIG. 9 is a longitudinal section through an unloader valve for use in the system of FIG. 8.

A preferred construction of unloader valve which is similar to the unloader valve of FIG. 5, is illustrated in FIG. 9 of the drawings. In fact the operation of the valve is the same as that of FIG. 5 and only the arrangement and layout of the parts have been changed for convenience. Thus corresponding reference numerals have been applied to corresponding parts.

In the valve of FIG. 9 the restrictor 78 has been omitted since an aperture 114 between the passage 77 and the land 61 provides the necessary restriction.

Figure 10:
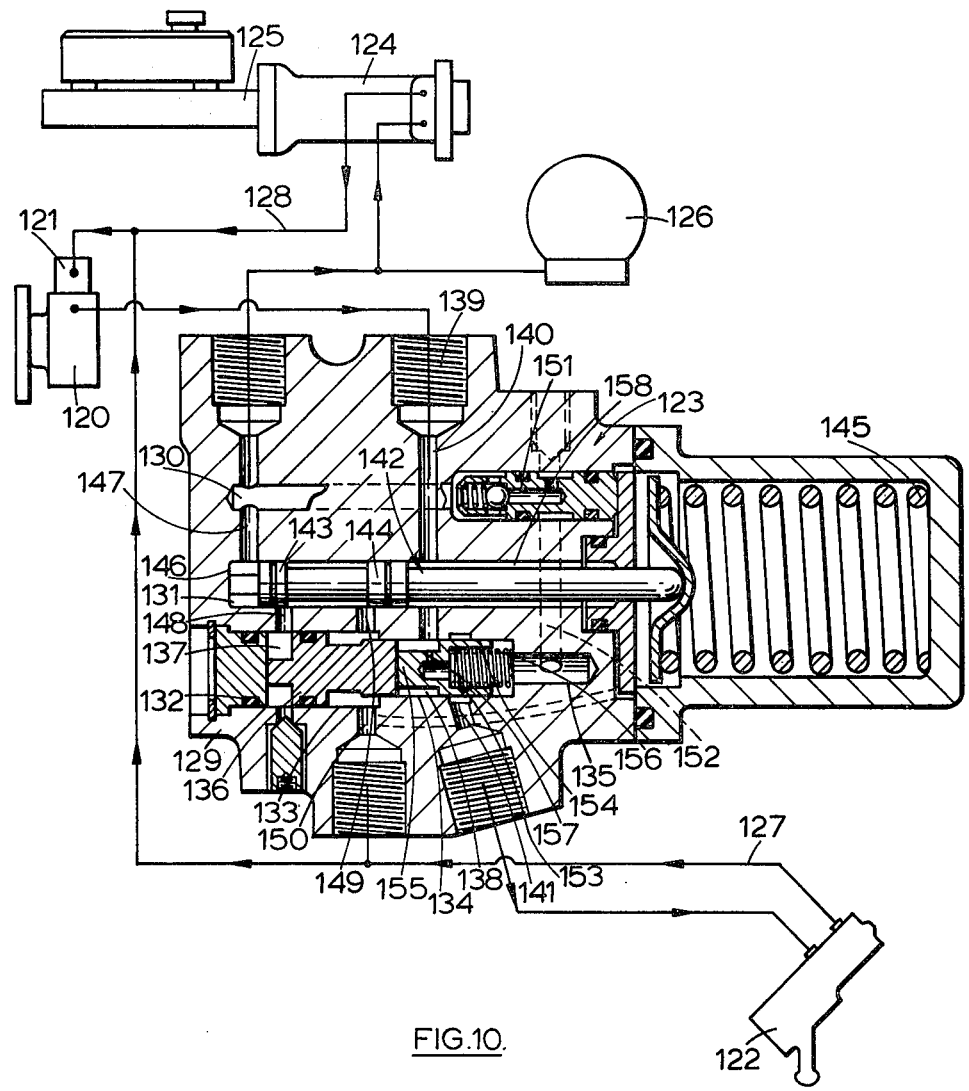
FIG. 10 is layout of an hydraulic power system for a vehicle including a longitudinal section through a priority valve.

In the hydraulic power system shown in FIG. 10, a pump 120, conveniently driven by the prime mover of a vehicle, draws hydraulic fluid from a tank 121 and pumps some to both a power steering mechanism 122 and a braking mechanism through the unloader valve which comprises common priority valve 123. The braking mechanism comprises a power-servo 124 for actuating a brake-applying hydraulic master cylinder 125, and an hydraulic accumulator 126. A return line 127 is provided from the steering mechanism 122 to the tank 121, and a return line 128 is provided from the power-servo to the tank.

The priority valve 123 comprises a housing 129 provided with three parallel longitudinally extending bores 130, 131 and 132.

The bore 132 is closed at opposite ends and is of stepped outline having three adjacent bore portions 133, 134 and 135 of which the portions 133 and 135 which are of greatest and smallest areas are disposed at opposite ends of the central portion 134. A differential piston 136 works in the bore portions 133 and 134 and opposite ends of the piston 136 divide the bore into a first chamber 137 of greater area and a second chamber 138 of smaller area. The second chamber 138 is connected to an inlet port 139 through a passage 140 which traverses the bore 131 and to an outlet port 141 spaced axially from the passage 140. The inlet port 139 is connected to the output from the pump 120, and the outlet port 141 is connected to the steering mechanism 122.

The bore 131 which is disposed between the bores 130 and 132 is also closed at opposite ends. A pressure responsive valve member comprising a spool 142 provided with axially spaced lands 143 and 144 which work in the bore 131 projects through a closure for the end of the bore 131 remote from the chamber 137 and is acted upon by a cut-out spring 145 which normally urges the spool into a cut-out position in engagement with a stop 146 defined by the opposite end of the bore 131. In this position the end of the land 143 which is remote from the spring 145 is connected to the power servo 124 and the accumulator 126 through an outlet passage 147 which traverses the bore 130, and both ends of the portion of the differential piston 136 which is of greater area are interconnected through axially spaced ports 148 and 149 which interconnect the bores 131 and 132 at positions which are disposed between the two lands 143 and 144. Thus both ends of the portion of the piston 136 are subjected to equal pressures corresponding to the pressure of fluid in the tank 121 to which the end of that portion of the piston 136 remote from the chamber 137 is connected through an exhaust port 150.

The bore 130 accommodates a one-way valve 151 which opens towards the outlet passage 147 and is connected to the bore portion 135 of the bore 132 through a transverse passage 152.

A by-pass valve 153 is housed in the second chamber 138. The by-pass valve 153 comprises a hollow spool 154 working in the bore portion 134 and provided with an inner end portion 155 of reduced diameter which is urged towards the differential piston 136 and into a cut-out position by means of a by-pass spring 156. In the cut-out position the spool closes the outlet port 141 leading to the steering mechanism 122 but the inlet port 139 still communicates with the transverse passage 152 through a restricted by-pass or metered orifice 157 in the spool 154.

When the prime mover of the vehicle is started the pump 120 delivers fluid under pressure to the steering mechanism 122 through the passage 140 and past the by-pass valve 153 where the pump pressure urges the spool 154 away from the differential piston 136 and against the loading in the by-pass spring 156 at least partially to expose the outlet port 141.

If the pressure of the accumulator 126 is at a minimum value of say 300 p.s.i., the pump pressure rises to a value exceeding that figure, for example 350 p.s.i., with the extra 50 p.s.i. being caused by the loading of the spring 156. Simultaneously the accumulator 126 is charged through the orifice 157 and the one-way valve 151. As the pressure in the accumulator rises, the pressure of the pump also rises but with the differential of 50 p.s.i. being maintained.

When the pressure in the accumulator 126 reaches a predetermined maximum value of say 800 p.s.i., such a maximum pressure acting over the area of the end of the spool 142 through the passage 147 produces a force sufficient to overcome the loading in the spring 145. Thus the spool 142 moves away from the stop 146 and the supply position and into a divert position in which the land 143 first closes the port 148 to isolate the first chamber 137 from the port 149 and thereafter places the chamber 137 in communication with the accumulator through the port 148. The pressure in the first chamber 137 acts on the differential piston 136 to urge it in a direction to engage the end portion 155 of the spool 154 and advance it against the spring 156 to open the port 141 fully so that the whole output from the pump 120 passes to the steering mechanism 122 from whence it is returned to the tank 121 through the return line 127. This results in a loss of pump pressure from an annular chamber 158, so that the spool 142 is urged more strongly against the spring 145.

Since normal pump output is 300 in $^3$/min or 5 in $^3$/sec and since only 5% of the flow goes to the accumulator through the orifice 157, the flow of the accumulator is 0.25 in $^3$/sec. Where the volume of the accumulator 126 is 2.5 in $^3$ the time required to charge the accumulator is 10 seconds.

Should the servo 124 be operated several times the pressure in the accumulator will reduce and when the pressure falls to a predetermined minimum value, say 500 p.s.i., the force in the spring 145 is sufficient to overcome the force of the pressure in the accumulator acting over the full area of the spool 142. The spool 142 returns to the supply position shown in FIG. 10 with the first chamber 137 being reconnected to the tank 121. The differential piston 136 and the spool 154 return to their original positions slowly because of the orifice 157 to re-engage the pump drive gently and the pump pressure then rises to re-charge the accumulator 126.

If the steering mechanism 122 is operated whilst the accumulator 126 is being charged and the steering pressure is lower than the pump pressure, then the by-pass valve 153 behaves as if nothing had happened since the steering pressure has no effect on the by-pass valve 153.

Should however the steering mechanism demand a pressure from the pump in excess of the pressure required to charge the accumulator 126, the by-pass valve 153 moves against the spring 156 to open the outlet 141 fully. Under this condition the accumulator 126 still continues to be charged through the orifice 157 and the one-way valve 151.

When the brakes on a vehicle are applied, the volume required is provided directly from the accumulator 126 so that the power steering mechanism is unaffected by the sudden demand for fluid caused by the brake application.

Figure 11:
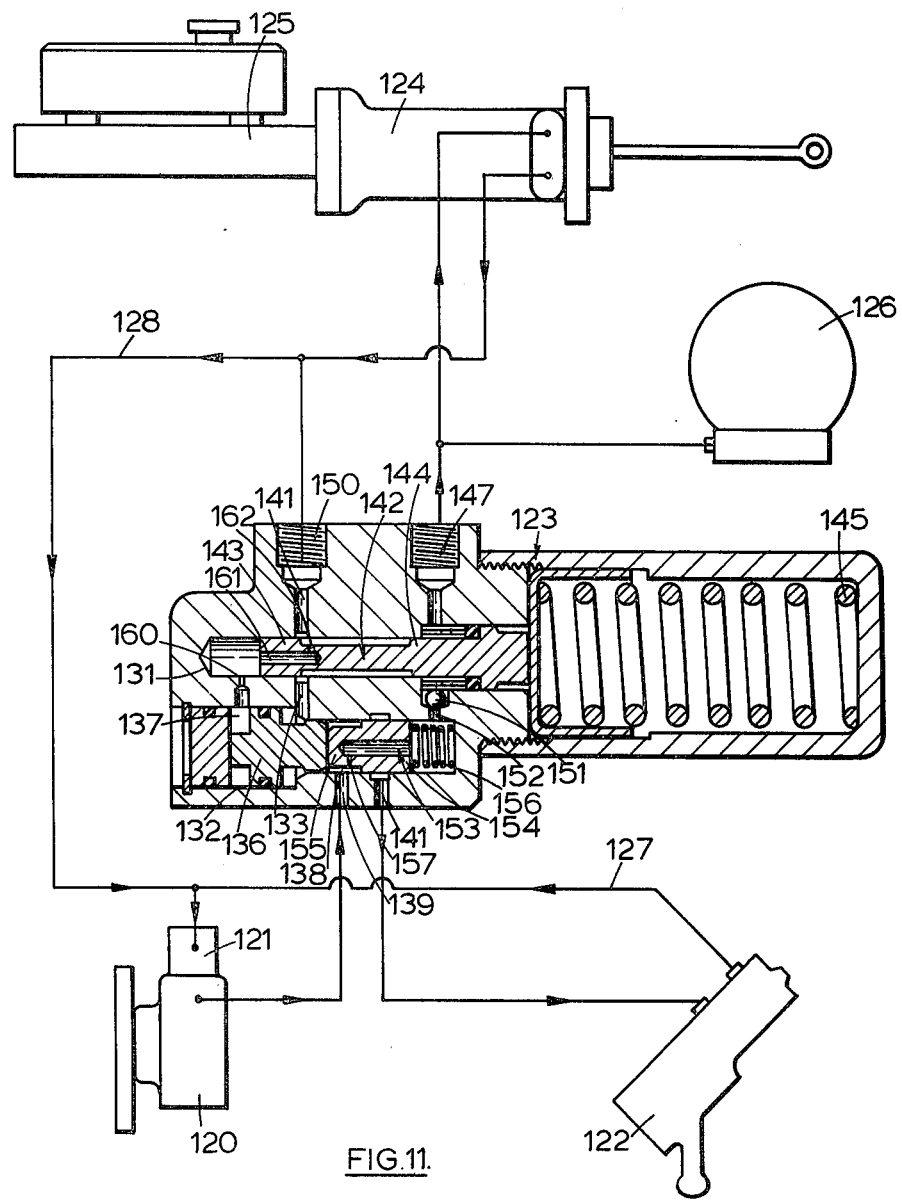
FIG. 11 is a layout of a system similar to the system of FIG. 10 but incorporating a modified priority valve.

In the embodiment of FIG. 11 a restrictor 160 is located between the first chamber 137 and the bore 131, and the spool 142 is provided with an axial bore 161 and a communicating radial port 162 to connect the first chamber 137 with the exhaust port 141 when the spool 142 is in the supply position. The bore 130 is omitted and the one-way valve 151 is located in the passage 152 which leads to the outlet 147.

The restrictor 160 reduces the rate at which the by-pass valve 153 can return to an initial position when the accumulator 126 is to be re-charged, since the fluid in the first chamber 137 can only pass to the exhaust port 141 through the restrictor 160. This is particularly advantageous when the vehicle is travelling fast since slow operation of the by-pass valve 153 prevents the application of a sudden pump torque on the drive belt. The pressure drop across the restrictor 160 is determined initially by the load in the spring 157 acting over the area of the piston which is exposed to pressure in the first chamber 137.

When the by-pass valve 153 is unloaded however, the pressure drop between the first chamber 137 and the bore 131 is initially say 400 p.s.i. rising to 750 p.s.i., and the restrictor delay is therefore only very short.

The construction and operation of the priority valve and the braking system illustrated in FIG. 11 is otherwise the same as that of FIG. 10 and corresponding reference numerals have been applied to corresponding parts.

In the embodiment of FIGS. 10 and 11 the accumulator 126 can be increased in size to provide other power service, for example, a self-levelling suspension system, or an hydraulic car jack.

Also the pressure drop across the by-pass valve 153 when the accumulator is being charged is substantially 50 p.s.i., irrespective of the pressure at that time operative at the pump or the accumulator, except when the steering pressure exceeds the accumulated pressure. As the diameter of the orifice 157 is known and the pressure drop is a constant, say 50 p.s.i., for a given fluid viscosity the flow past the orifice and hence the flow to the accumulator 126 can be accurately assessed. Therefore the 5% take-off flow for accumulator charging can be accurately controlled.

I claim:

1. An hydraulic system comprising a tank for hydraulic fluid, an hydraulic accumulator, a pump for drawing hydraulic fluid from said tank to charge said accumulator, an unloader valve disposed in a supply line between said pump and said accumulator for preventing said accumulator from being overcharged and to allow said pump to re-charge said accumulator should the pressure of fluid therein fall below a desired minimum value, wherein said unloader valve incorporates a control valve, and a pressure responsive slave which is operated by fluid pressure under the control of said control valve, said control valve comprising a valve member which is movable between a first position in which said accumulator is isolated from said slave so that pump pressure is supplied to said accumulator, and a second position in which fluid pressure from said accumulator can act on said slave to render said slave operative to reduce said pump pressure or disable said pump, and a cut-out spring for biassing said valve member at all times towards said first position, said valve member having different effective areas of which a smaller area is subjected to a control pressure dependent upon the pressure in said accumulator and in response to which said valve member can move at a cut-out point from said first position into said second position, and a greater area is subjected to said pressure in said accumulator, at least when said valve member is in said second position, to determine a cut-in point at an accumulator pressure less than the pressure in said accumulator at the cut-out point and at which the valve member can move from said second position into said first position.

2. An hydraulic system according to claim 1, wherein a restriction is located between said slave and said control valve.

3. An hydraulic system according to claim 1, wherein said valve member comprises a valve spool which works in a bore in a housing and is acted on at one end by said cut-out spring, and said valve spool includes axially spaced lands which control communication between passages in the housing which are connected to said pump, said slave and said accumulator, and a one-way valve is located in the housing between those of the said passages which are connected respectively to said pump and said accumulator to permit flow from said pump into said accumulator.

4. An hydraulic system according to claim 1, wherein said control pressure acting on said smaller area comprises said accumulator pressure.

5. An hydraulic system according to claim 1, wherein said control pressure acting on said smaller area comprises said pump pressure.

6. An hydraulic system according to claim 1, wherein said control pressure acting on said smaller area comprises a combination of said pump pressure and said accumulator pressure.

7. An hydraulic system according to claim 1, wherein said slave comprises a piston for disabling said pump when said cut-out pressure is attained.

8. An hydraulic system according to claim 7, wherein said piston disconnects a drive to said pump when said cut-out pressure is attained.

9. An hydraulic system according to claim 1, wherein said slave comprises a slave member for connecting said pump to said tank when said cut-out pressure is attained.

10. An hydraulic system according to claim 1, comprising an hydraulic braking system and a power steering mechanism which incorporates a brake-operating hydraulic servo, wherein said unloader valve comprises a priority valve for regulating and determining relative proportions of fluid supplied to said brake-operating hydraulic servo, said accumulator being adapted to operate said servo and said slave comprising a slave member for controlling communication between said pump and said power steering mechanism.

11. An hydraulic system as claimed in claim 10, wherein said slave member comprises a differential piston working in a stepped bore with first and second chambers of greater and smaller areas defined in said bore at opposite ends of said piston, said first chamber being in communication with said tank and cut-off from said accumulator when said valve member is in said first position and being in communication with said accumulator when said valve member is in said second position, and a by-pass valve is housed in said second chamber for controlling communication between said pump and said accumulator through a one-way valve and between said pump and said steering mechanism, said by-pass valve comprising a spool working in said chamber of smaller area and having an inner end of reduced diameter, a land for closing an exhaust port in communication with a first outlet connected to said steering mechanism, and a restricted passage providing communication between said pump and said accumulator through the spool at all times, and a by-pass spring urging said inner end of said spool towards said differential piston and into a cut-out position in which said exhaust port is closed, said spool being urged towards a delivery position by said pump pressure to expose at least partially said exhaust port when said pump is operating and said differential piston acting to urge said spool into said delivery position to expose said exhaust port fully when said valve member is in said second position.

* * * * *